United States Patent
Kim et al.

(10) Patent No.: US 9,510,234 B2
(45) Date of Patent: Nov. 29, 2016

(54) METHOD AND DEVICE FOR UPDATING AREA IN WIRELESS COMMUNICATION SYSTEM

(71) Applicant: LG Electronics Inc., Seoul (KR)

(72) Inventors: Jaehyun Kim, Anyang-si (KR); Laeyoung Kim, Anyang-si (KR); Taehyeon Kim, Anyang-si (KR); Hyunsook Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 22 days.

(21) Appl. No.: 14/400,729

(22) PCT Filed: Jun. 26, 2013

(86) PCT No.: PCT/KR2013/005640
§ 371 (c)(1),
(2) Date: Nov. 12, 2014

(87) PCT Pub. No.: WO2014/003431
PCT Pub. Date: Jan. 3, 2014

(65) Prior Publication Data
US 2015/0131437 A1    May 14, 2015

Related U.S. Application Data

(60) Provisional application No. 61/665,882, filed on Jun. 28, 2012, provisional application No. 61/665,902, filed on Jun. 29, 2012.

(51) Int. Cl.
*H04W 28/02* (2009.01)
*H04W 60/00* (2009.01)
*H04W 28/12* (2009.01)

(52) U.S. Cl.
CPC ......... *H04W 28/0289* (2013.01); *H04W 28/12* (2013.01); *H04W 60/00* (2013.01)

(58) Field of Classification Search
None
See application file for complete search history.

(56) References Cited

U.S. PATENT DOCUMENTS

| | | | |
|---|---|---|---|
| 8,811,244 B2 * | 8/2014 | Lee | H04W 76/066 370/310 |
| 8,837,408 B2 * | 9/2014 | Sun | H04W 72/04 370/242 |

(Continued)

FOREIGN PATENT DOCUMENTS

| KR | 1020090126282 | 12/2009 |
|---|---|---|
| KR | 1020100027495 | 3/2010 |

(Continued)

OTHER PUBLICATIONS

3rd Generation Partnership Project; Technical Specification Group Services and System Aspects; Study on Core Network Overload Solutions (Release 11), 3GPP TR 23.843 v0.4.0, pp. 1-20 (Apr. 2011).*

(Continued)

*Primary Examiner* — Benjamin Lamont
(74) *Attorney, Agent, or Firm* — Dentons US LLP

(57) ABSTRACT

The present invention relates to a wireless communication system and, more specifically, to a method and a device for updating an area of a terminal. A method for processing an area update request of a terminal in a network node, according to one embodiment of the present invention, comprises the steps of: receiving an area update request message from the terminal; and determining whether or not the area update request is accepted on the basis of indication information included in the area update request message when the network is in a congestion state, wherein if the indication information indicates that the terminal has moved to a new area that is not registered, it can be determined that the area update request has been accepted.

12 Claims, 7 Drawing Sheets

(56) References Cited

U.S. PATENT DOCUMENTS

| | | | |
|---|---|---|---|
| 2010/0240367 A1* | 9/2010 | Lee | H04W 36/0077 455/435.2 |
| 2011/0171924 A1* | 7/2011 | Faccin | H04W 4/22 455/404.1 |
| 2011/0199905 A1 | 8/2011 | Pinheiro | |
| 2012/0106332 A1* | 5/2012 | Tiwari | H04W 60/005 370/230 |
| 2012/0115454 A1 | 5/2012 | Liao | |
| 2012/0208486 A1* | 8/2012 | Liao | H04W 28/02 455/404.1 |
| 2012/0218889 A1* | 8/2012 | Watfa | H04W 60/04 370/230 |
| 2012/0238236 A1* | 9/2012 | Liao | H04W 28/02 455/404.2 |
| 2012/0257571 A1* | 10/2012 | Liao | H04W 4/005 370/328 |
| 2013/0029631 A1* | 1/2013 | Tiwari | H04W 76/007 455/404.1 |
| 2013/0295930 A1* | 11/2013 | Tiwari | H04W 60/00 455/435.1 |
| 2013/0301466 A1* | 11/2013 | Nenner | H04W 36/0022 370/252 |

FOREIGN PATENT DOCUMENTS

| | | |
|---|---|---|
| WO | 2011139098 | 11/2011 |
| WO | 2011156264 A2 | 12/2011 |

OTHER PUBLICATIONS

Huawei: "SGSN/MME overload control by accepting connection request", vol. SA WG2, No. Elbonia; Jul. 6, 2010, Jun. 29, 2010, XP050458242.

Zte: "RAU when T3346 expires or is stopped", vol. CT WG1, No. Malta; Aug. 22, 2011, Aug. 15, 2011, XP050533666.

"3rd Generation Partnership Project: Technical Specification Group Services and System Aspects; Study on Gore Network Overload Solutions: (Release 11)", vol. SA WG2, No. V).4), Jun. 22, 2011, pp. 1-19, XP050553383.

* cited by examiner

METHOD AND DEVICE FOR UPDATING AREA IN WIRELESS COMMUNICATION SYSTEM

This application is a 35 USC §371 National Stage entry of International Application No. PCT/KR2013/005640 filed on Jun. 26, 2013, and claims priority to U.S. Provisional Application No. 61/665,882 filed on Jun. 28, 2012 and 61/665,902 filed on Jun. 29, 2012, all of which are hereby incorporated by reference in their entireties as if fully set forth herein.

TECHNICAL FIELD

The following description relates to a wireless communication system and, more particularly, to a method and apparatus for updating an area of a terminal.

BACKGROUND ART

Machine type communication (MTC) refers to a communication scheme between one or more machines and is also referred to as machine-to-machine (M2M) communication. Here, a machine refers to an entity which does not require direct human operation or intervention. For example, the machine may include not only a device including a mobile communication module, such as a meter or a vending machine, but also a user equipment such as a smartphone which is capable of automatically accessing a network without operation/intervention of a user to perform communication. Various examples of such a machine are referred to as an MTC device or terminal in the present specification. That is, MTC refers to communication performed by one or more machines (that is, MTC devices) without human operation/intervention.

MTC may include communication between MTC devices (e.g. device-to-device (D2D) communication) and communication between an MTC device and an MTC application server. Examples of communication between an MTC device and an MTC application server include communication between a vending machine and a server, communication between a point of sale (POS) device, and communication between an electric meter, a gas meter, or a water meter and a server. MTC-based applications may include security, transportation, healthcare, etc.

Meanwhile, when congestion or overload occurs in a network, congestion control may be performed in a control plane. For example, network congestion control may be performed in a non-access stratum (NAS) level which is the uppermost stratum in the control plane between a terminal and a network control node in a radio interface.

Generally, when a network congestion state occurs, the network may configure a back-off timer for inhibiting a request for the network for a predetermined time. According to operation of a currently defined wireless communication system, when the terminal moves to an unregistered area while the back-off timer is running in the terminal, the terminal cannot perform area update for the network due to restrictions caused by the back-off timer. In this case, even though the network transmits a paging message in order to search for the terminal, the terminal cannot receive the paging message and thus cannot perform paging response operation. The terminal cannot be offered an important mobile terminated (MT) service (e.g. MT-call/short message service (SMS), etc.) due to failure of such a paging procedure. Thus, operation related to network congestion control, performed between the terminal and the network, is not clear and a service cannot be correctly provided to the terminal. Especially, in a wireless communication system supporting MTC, since the network should provide services to lots of terminals (or MTC devices), the afore-described network congestion situation needs to be clearly processed.

DISCLOSURE

Technical Problem

An object of the present invention is to provide a method and apparatus for enabling a terminal to correctly perform a paging response operation and to receive a seamless service even when the terminal moves to an unregistered area.

The technical objects that can be achieved through the present invention are not limited to what has been particularly described hereinabove and other technical objects not described herein will be more clearly understood by persons skilled in the art from the following detailed description.

Technical Solution

According to an embodiment of the present invention to achieve the technical objects, provided herein is a method for processing an area update request of a user equipment (UE) in a network node, including receiving an area update request message from the UE; and determining whether to accept an area update request based on indication information included in the area update request message when the network is congested, wherein, if the indication information indicates that the UE moves to a new area that is not registered, it is determined that the area update request is accepted.

According to another embodiment of the present invention to achieve the technical objects, provided herein is a network node for processing an area update request of a user equipment (UE), including a transceiver module; and a processor, wherein the processor is configured to receive an area update request message from the UE through the transceiver module; and to determine whether to accept an area update request based on indication information included in the area update request message when the network is congested, and if the indication information indicates that the UE moves to a new area that is not registered, it is determined that the area update request is accepted.

In the embodiments according to the present invention, the following may be commonly applied.

The method may further include transmitting an area update request accept message to the UE upon determining that the area update request is accepted.

If the UE receives the area update request accept message while a back-off timer is running in the UE, the back-off timer may be maintained until the back-off timer expires.

When the area update request is accepted, if the UE receives a paging message while a back-off timer is running, the UE may stop the back-off timer and perform a response to the paging message.

The indication information may be evolved packet system (EPS) update type information, update type information, EPS update status information, or update status information, and the indication information may be set to a specific state or a specific value indicating that the UE moves to a new area that is not registered and requests area update.

If the indication information is set to the specific state or the specific value and if a tracking area identity (TAI) value or a routing area identity (RAI) value included in the area update request message is different from a TAI or RAI value stored in the network, the indication information may be set to indicate that the UE moves to a new area that is not registered and requests area update.

If the TAI or RAI value included in the area update request message is different from the TAI or RAI value stored in the network, the indication information may be set to indicate that the UE moves to a new area that is not registered and requests area update.

The new area may be a new tracking area (TA), a new routing area (RA), or a new public land mobile network (PLMN).

The new TA or the new RA may be a TA or an RA not included in a TA list or an RA list registered by the UE.

The area update request message may be one of a tracking area update (TAU) message, a routing area update (RAU) message, a combined TAU message, and a combined RAU message.

The area update request message may be transmitted even when a back-off timer is running in the UE.

The area update request message may be transmitted when the UE enters the new area even when the back-off timer is running.

A value for the back-off timer may be included in a non-access stratum (NAS) reject message from a network before the UE enters the new area.

The back-off timer may be a mobility management (MM) back-off timer.

The foregoing overall description and the following detailed description of the present invention are exemplary and are intended to provide further explanation of the invention as claimed.

Advantageous Effects

According to the present invention, even when a terminal moves to an unregistered area, the terminal can correctly perform paging response operation and can receive a seamless service.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
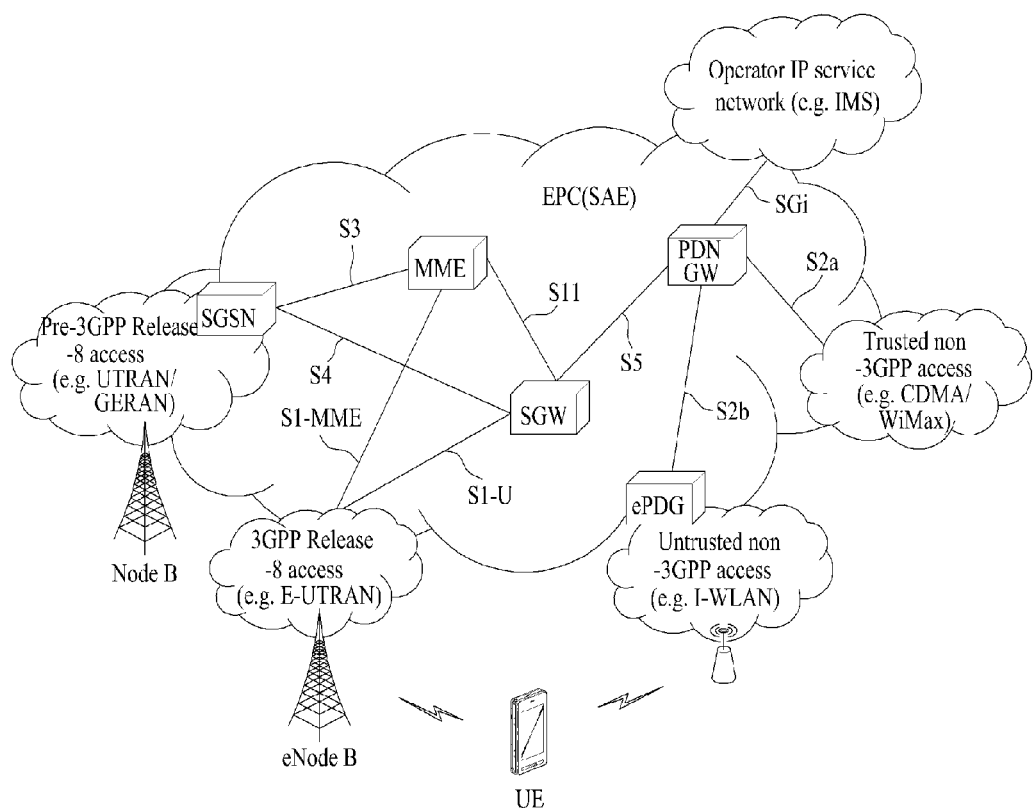
FIG. 1 is a diagram showing the schematic architecture of an evolved packet core (EPC).

The embodiments described hereinbelow are combinations of elements and features of the present invention in a predetermined format. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the technical scope of the present invention.

In some instances, well-known structures and devices are omitted in order to avoid obscuring the concepts of the present invention or the important functions of the structures and devices are shown in block diagram form. The same reference numbers will be used throughout the drawings to refer to the same or like parts.

The embodiments of the present invention can be supported by standard documents disclosed for at least one of an institute of electrical and electronics engineers (IEEE) 802 series system, a 3rd generation partnership project (3GPP) system, a 3GPP long term evolution (3GPP LTE) system, a 3GPP LTE-advanced (LTE-A) system, and a 3GPP2 system. For steps or parts which are not described to clarify the technical idea of the present invention, reference may be made to these documents. Further, all terms as set forth herein can be explained by the standard documents.

The following technologies may be used in various wireless communication systems. For clarity, a 3GPP LTE system and a 3GPP LTE-A system will be focused upon in the following description but the scope of the present invention is not limited thereto.

Terminology used in the present specification is defined as follows.

UMTS (Universal Mobile Telecommunications System): Third generation mobile communication technology based on global system for mobile communication (GSM), developed by 3GPP.

EPS (Evolved Packet System): Network system consisting of an evolved packet core (EPC), which is an Internet protocol (IP)-based packet switched (PS) core network, and of an access network such as LTE, UTRAN, etc. EPS is an evolved version of UMTS.

NodeB: Base station of GERAN/UTRAN, which is mounted outdoors and coverage of which forms a macro cell.

eNodeB: Base station of E-UTRAN, which is mounted outdoors and coverage of which forms a macro cell.

UE (User Equipment): UE may be referred to as terminal, mobile equipment (ME), mobile station (MS), etc. In addition, UE may be a portable device such as a laptop, a mobile phone, a personal digital assistant (PDA), a smartphone, or a multimedia apparatus or may be a non-portable device such as a personal computer (PC) or a vehicle mounted apparatus. A UE or terminal may indicate an MTC device in terms of MTC.

HNB (Home NodeB): Base station of a UMTS network, which is mounted indoors and coverage of which forms a micro cell.

HeNB (Home eNodeB): Base station of an EPS network, which is mounted indoors and coverage of which forms a micro cell.

MME (Mobility Management Entity): Node of an EPS network performing functions of mobility management (MM) and session management (SM).

PDN GW (Packet Data Network-Gateway)/PGW: Node of an EPS network performing functions of UE IP address allocation, packet screening and filtering, charging data collection, etc.

SGW (Serving Gateway): Node of an EPS network performing functions of mobility anchor, packet routing, idle mode packet buffering, MME triggering to page a UE, and the like.

PCRF (Policy and Charging Rule Function): Node of an EPS network performing policy decision for dynamically applying differentiated quality of service (QoS) and charging policy on a service flow basis.

OMA DM (Open Mobile Alliance Device Management): Protocol designed to manage mobile devices such as a cellular phone, a PDA, and a portable computer, which perform functions of device configuration, firmware upgrade, error reporting, etc.

OAM (Operation Administration and Maintenance): Network management functional group providing functions of network default display, performance information, data diagnosis, etc.

NAS (Non-Access Stratum): Higher stratum of a control plane between a UE and an MME. This is a functional layer for exchanging signaling and traffic messages between a UE and a core network in an LTE/UMTS protocol stack, which supports mobility of a UE and supports a session management procedure for establishing and maintaining IP connection between a UE and a PDN GW.

NAS configuration MO (NAS configuration Management Object): Management object (MO) used to configure parameters associated with NAS functionality for a UE.

SIPTO (Selected IP Traffic Offload): Transmission scheme through detour to a public network such as the Internet other than an operator network during transmission of specific IP traffic through an H(e)NB or a macro cell. In a 3GPP release-10 system, an operator supports transfer of user traffic by selecting a PDN-GW physically adjacent to a UE in an EPC network.

PDN (Packet Data Network): Network in which a server supporting a specific service (e.g. a multimedia messaging service (MMS) server, a wireless application protocol (WAP) server, etc.) is located.

PDN connection (Packet Data Network connection): Logical connection between a UE and a PDN, which is expressed as one IP address (one IPv4 address and/or one IPv6 prefix).

APN (Access Point Name): Character string for denoting or distinguishing a PDN. In order to access a requested service or network (PDN), a UE passes through a corresponding PGW and APN is a predefined name (character string) in a network so as to find the PGW. For example, APN may be expressed as internet.mnc012.mcc345.gprs.

MTC (Machine Type Communications): Communication performed by a machine without human intervention.

MTC device: UE (e.g. vending machine, meter, etc.) performing a specific purpose using a communication function through a core network.

SCS (Services Capability Server): Server connected to a 3GPP network for communication with an MTC device in a home public land mobile network (PLMN) (HPLMN) and an MTC device using an MTC-interworking function (IWF). SCS provides capabilities for using one or plural applications.

MTC application: Service to which MTC is applied (e.g. remote meter reading, material movement tracking, etc.)

MTC application server: Server on a network over which an MTC application is executed.

MTC feature: Function of a network for supporting an MTC application. For example, MTC monitoring is a feature for preparing for equipment loss in an MTC application such as remote meter reading and low mobility is a feature for an MTC application for an MTC device such as a vending machine.

RAN (Radio Access Network): Unit including a NodeB, an eNodeB, and a radio network controller for controlling the Node B and eNodeB in a 3GPP network, which is present between UEs and provides a connection to a core network.

HLR (Home Location Register)/HSS (Home Subscriber Server): Database having subscriber information in a 3GPP network. HSS may perform functions such as configuration storage, identity management, user state storage, etc.

PLMN (Public Land Mobile Network): Network configured for the purpose of providing mobile communication services to individuals. This network may be configured on a per operator basis.

NAS level congestion control: Congestion or overload control function of an EPS network configured with APN based congestion control and normal NAS level mobility management control.

MM (Mobility Management) back-off timer: MM back-off timer is used to control congestion when a network is congested. While the MM back-off timer is running, a UE is configured so as not to perform attach, location information update (e.g. tracking area update (TAU), routing area update (RAU)), service request/extended service request, etc.) (however, a UE is configured to be able to exceptionally request an emergency bearer service, a paging response in an old area, or a multimedia priority service (MPS), even though the MM back-off timer is running).

SM (Session Management) back-off timer: SM back-off timer is used to control congestion when a network is congested. While the SM back-off timer is running, a UE is configured not to set or change an associated APN based session (however, a UE is configured to be able to exceptionally request an emergency bearer service or an MPS even though the SM back-off timer is running).

TA (Tracking Area): Registration area of a UE in an EPS network. TA is identified by a tracking area identity (TAI).

RA (Routing Area): Registration area of a UE for a packet core network domain in a GPRS/UMTS network. RA is identified by a routing area identity (RAI).

ISR (Idle mode Signaling Reduction): Function in which an idle-mode UE is capable of moving between an evolved-UMTS terrestrial radio access network (E-UTRAN) and a global system for mobile communication (GSM)/enhanced data rates for global evolution (EDGE) radio access network (GERAN)/UTRAN in registered RAs and TAs without performing TAU/RAU with a core network (specifically, an MME/SGSN).

Hereinafter, a description will be given based on the above-described terminology.

FIG. 1 is a diagram showing the schematic architecture of an evolved packet core (EPC).

The EPC is a fundamental element of system architecture evolution (SAE) for improving performance of 3GPP technology. SAE corresponds to a research project for deciding a network structure supporting mobility between various types of networks. SAE aims to provide an optimized packet-based system which supports various radio access technologies based on IP and provides improved data transfer capabilities.

More specifically, the EPC is a core network of an IP mobile communication system for a 3GPP LTE system and may support a packet-based real-time and non-real-time service. In an existing mobile communication system (i.e. a second generation (2G) or third generation (3G) mobile communication system), a core network function was implemented through two distinct sub-domains of a circuit-switched (CS) network for voice and a packet-switched (PS) network for data. However, in a 3GPP LTE system which is evolved from the third generation communication system, sub-domains of the CS network and the PS network were unified into one IP domain. That is, in the 3GPP LTE system, connection between terminals each having IP capability may be configured through an IP based base station (e.g. an evolved Node B (eNodeB)), an EPC, an application domain (e.g. an IP multimedia system (IMS)). That is, the EPC is a structure necessary to implement an end-to-end IP service.

The EPC may include various components. FIG. 1 shows a serving gateway (SGW), a packet data network gateway (PDN GW), a mobility management entity (MME), a serving GPRS (general packet radio service) supporting node (SGSN), and an enhanced packet data gateway (ePDG).

The SGW operates as a boundary point between a radio access network (RAN) and a core network and is an element which performs a function for maintaining a data path between an eNodeB and a PDN GW. In addition, if a terminal moves over an area served by the eNodeB, the SGW serves as a local mobility anchor point. That is, packets may be routed through the SGW for mobility in an E-UTRAN (defined after 3GPP release-8). In addition, the SGW may serve as an anchor point for mobility management with another 3GPP network (an RAN defined before 3GPP release-8, e.g. UTRAN or GERAN).

The PDN GW corresponds to a termination point of a data interface for a packet data network. The PDN GW may support policy enforcement features, packet filtering, and charging support. In addition, the PDN GW may serve as an anchor point for mobility management with a 3GPP network and a non-3GPP network (e.g. an untrusted network such as an interworking wireless local area network (I-WLAN) and a trusted network such as a code division multiple access (CDMA) or WiMax network).

Although the SGW and the PDN GW are configured as separate gateways in the example of the network architecture of FIG. 1, the two gateways may be implemented according to a single gateway configuration option.

The MME performs signaling and control functions in order to support access of a UE for network connection, network resource allocation, tracking, paging, roaming, and handover. The MME controls control-plane functions associated with subscribers and session management. The MME manages numerous eNodeBs and performs signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g. GPRS networks).

The ePDG serves as a security node for an untrusted non-3GPP network (e.g. an I-WLAN, a Wi-Fi hotspot, etc.).

As described with reference to FIG. 1, a terminal having IP capabilities may access an IP service network (e.g. an IMS) provided by an operator through various elements in the EPC based on non-3GPP access as well as 3GPP access.

FIG. 1 shows various reference points (e.g. S1-U, S1-MME, etc.). In the 3GPP system, a conceptual link connecting two functions present in different functional entities of an E-UTRAN and an EPC is defined as a reference point. Table 1 shows the reference points shown in FIG. 1. In addition to the example of Table 1, various reference points may be present according to network architecture.

TABLE 1

| Reference point | Description |
|---|---|
| S1-MME | Reference point for control plane protocol between E-UTRAN and MME |
| S1-U | Reference point between E-UTRAN and SGW for per bearer user plane tunneling and inter eNodeB path switching during handover |
| S3 | Reference point between MME and SGSN, for providing user and bearer information exchange for inter-3GPP access network mobility in idle and/or active state. This reference point can be used intra-PLMN or inter-PLMN (e.g. in the case of inter-PLMN handover). |
| S4 | Reference point between SGW and SGSN, for providing related control and mobility support between GPRS Core and 3GPP anchor function of SGW. In addition, if direct tunnel is not established, this reference point provides user plane tunneling. |
| S5 | Reference point between SGW and PDN GW, for providing user plane tunneling and tunnel management. This reference point is used for SGW relocation due to UE mobility and if the SGW needs to connect to a non-co-located PDN GW for the required PDN connectivity. |
| S11 | Reference point between MME and SGW |
| SGi | Reference point between PDN GW and PDN. PDN may be an operator external public or private PDN or an intra operator PDN, e.g. for provision of IMS services. This reference point corresponds to Gi for 3GPP access. |

Among the reference points shown in FIG. 1, S2a and S2b correspond to a non-3GPP interface. S2a is a reference point for providing a user plane with related control and mobility support between trusted non-3GPP access and the PDN GW. S2b is a reference point for providing a user plane with related control and mobility support between the ePDG and the PDN GW.

Figure 2:
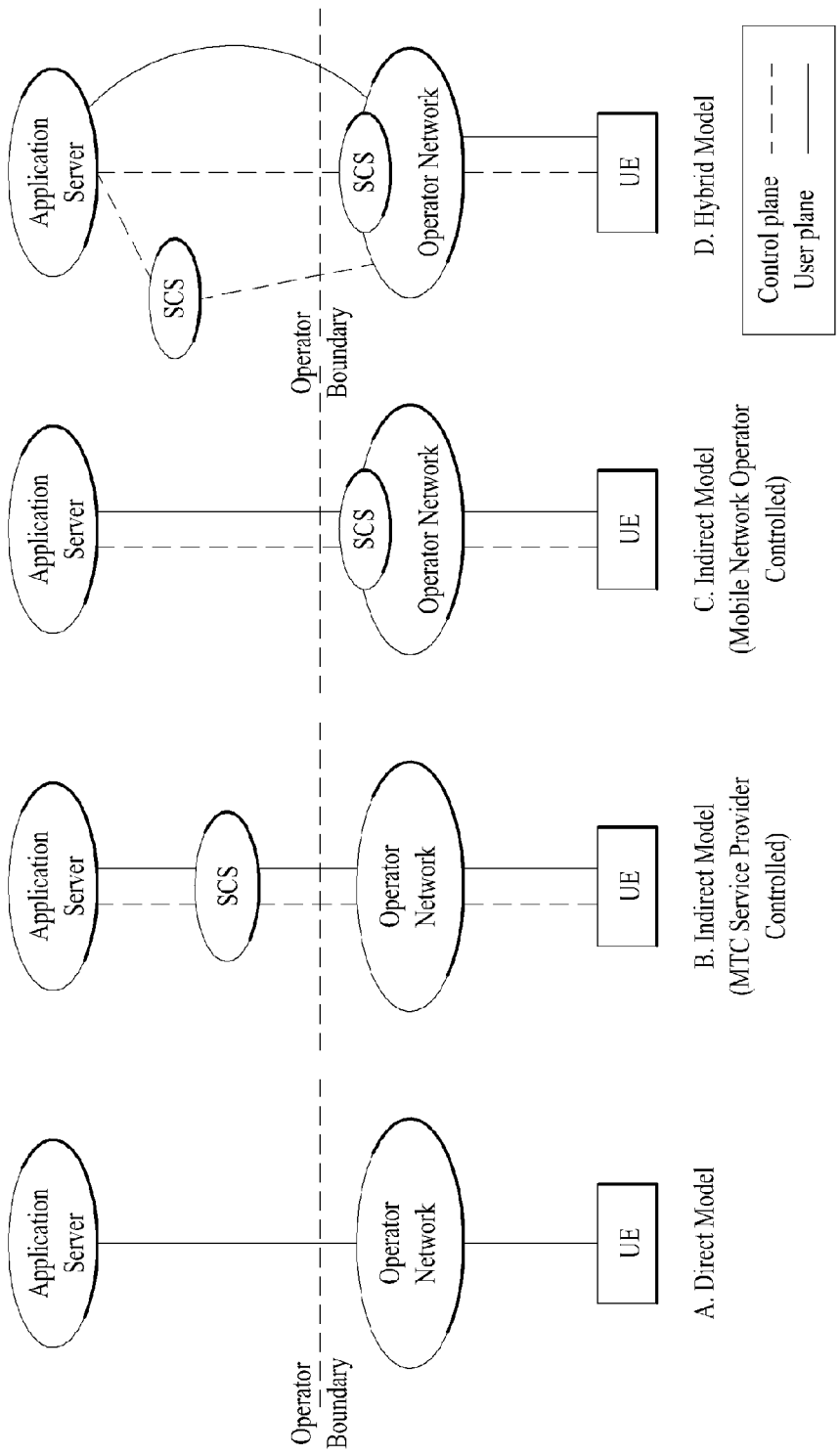
FIG. 2 is a diagram showing examples of an MTC communication model.

FIG. 2 is a diagram showing examples of an MTC communication model.

MTC applications are respectively executed in an MTC device and an SCS to interwork via communication using a network. At this time, various models of MTC traffic may be implemented depending upon what participates in communication between an MTC application and a 3GPP network. FIG. 2(a) shows a model in which communication is directly performed without an SCS, FIG. 2(b) shows a model in which an SCS is located outside an operator domain and FIG. 2(c) shows a model in which an SCS is located inside an operator domain. In addition, FIG. 2(a) corresponds to a direct communication scheme controlled by a 3GPP operator, FIG. 2(b) corresponds to a communication scheme controlled by a service provider, and FIG. 2(c) corresponds to a communication scheme controlled by a 3GPP operator.

The direct model of FIG. 2(a) shows that an MTC application directly performs communication with a UE (or an MTC device) with respect to a 3GPP network as an over-the-top (OTT) application.

The indirect model of FIGS. 2(b) and 2(c) shows that an MTC application indirectly performs communication with a UE (or an MTC device) using a supplementary service provided by a 3GPP network. More specifically, in the example of FIG. 2(b), the MTC application may use an SCS for supplementary services provided by a third-party service provider (that is, service provider not responsible for 3GPP). The SCS may communicate with the 3GPP network through various interfaces. Meanwhile, in the example of FIG. 2(c), the MTC application may use the SCS for supplementary services provided by a 3GPP operator (which corresponds to a service provider). Communication between the SCS and the 3GPP network is performed within a PLMN. In FIGS. 2(b) and 2(c), an interface between the SCS and the MTC application is not included in the 3GPP standard.

Since the indirect models of FIGS. 2(b) and 2(c) are not exclusive but complementary, a 3GPP operator may combine the indirect models for different applications. That is, an MTC communication module may be implemented as a hybrid model in which a direct model and an indirect model are simultaneously used. In the case of the hybrid model, the MTC device may communicate with a plurality of SCSs in an HPLMN and capabilities provided to MTC applications may differ in an SCS controlled by a service provider and an SCS controlled by the 3GPP operator.

Figure 3:
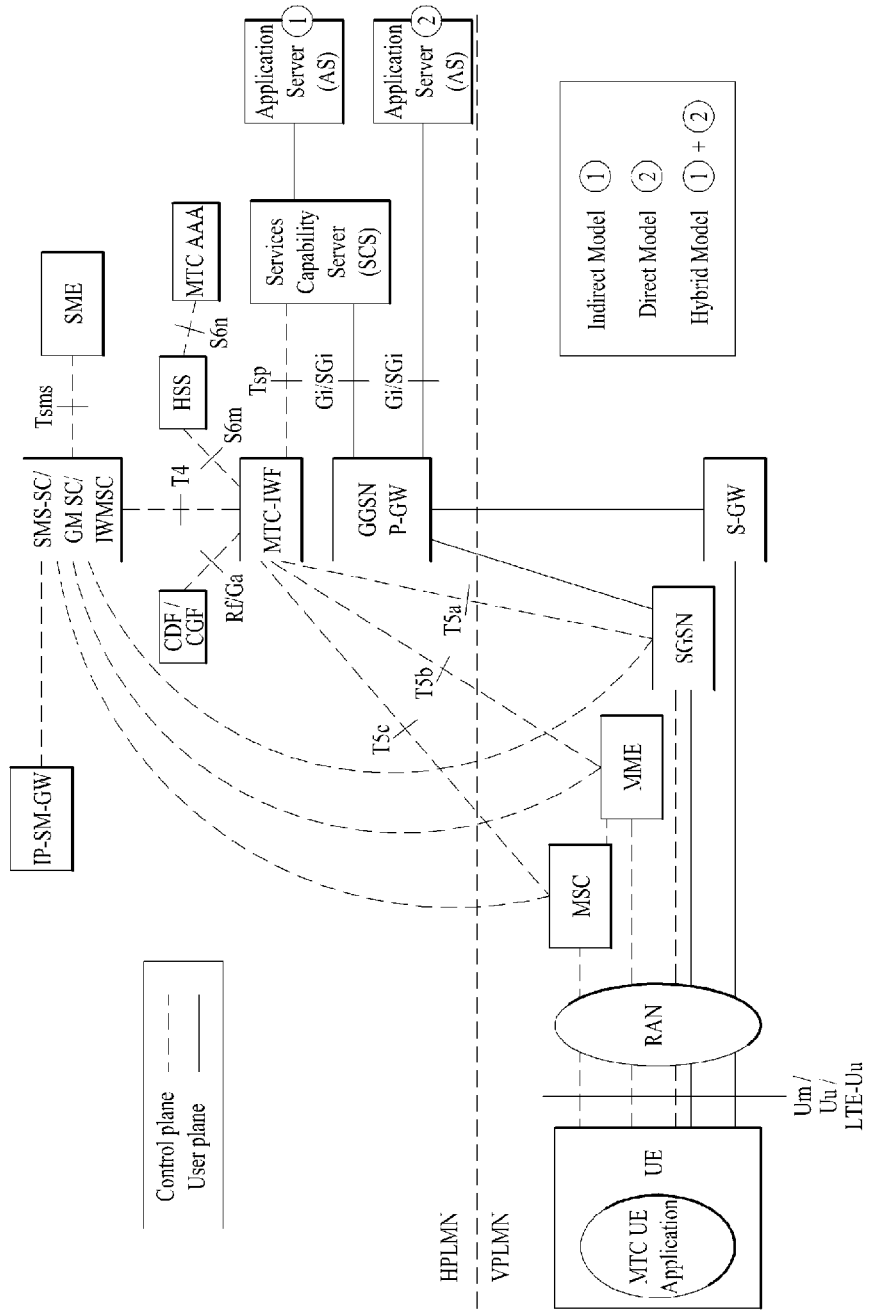
FIG. 3 is a diagram showing an exemplary model of an MTC architecture.

FIG. 3 is a diagram showing an exemplary model of an MTC architecture.

An end-to-end application between a UE (or an MTC device) used for MTC and an MTC application may use services provided by a 3GPP system and selective services provided by an SCS. A 3GPP system may provide transport and communication services (including a 3GPP bearer service, an IMS, and an SMS) including a variety of optimization services facilitating MTC. In FIG. 3, a UE used for MTC is connected to a 3GPP network (UTRAN, E-UTRAN, GERAN, I-WLAN, etc.) through a Um/Uu/LTE-Uu interface. The architecture of FIG. 3 includes various MTC models described with reference to FIG. 2.

First, entities shown in FIG. 3 will be described.

In FIG. 3, an MTC application may be executed by an application server on an external network and an SCS may be used for additional supplementary services. Technologies for implementing various MTC applications are applicable to an MTC application server and a detailed description thereof will be omitted. In addition, in FIG. 3, the MTC application server may access the SCS through a reference point API and a detailed description thereof will be omitted. Alternatively, the MTC application server may be co-located with the SCS.

The SCS is a server on a network for managing an MTC device and may be connected to a 3GPP network to communicate with nodes of a PLMN and a UE used for MTC.

An MTC-IWF may control interworking between the SCS and an operator core network and serve as a proxy for MTC operation. In order to support an MTC indirect or hybrid model, one or more MTC-IWFs may be present in an HPLMN. The MTC-IWF may relay and interpret a signaling protocol on a reference point Tsp to enable a PLMN to perform a specific function. The MTC-IWF may perform a function for authentication of an MTC server, a function for authentication of a control plane request from an MTC server, various functions associated with the below-described trigger indications, etc. before the MTC server establishes communication with a 3GPP network.

A short message service-service center (SMS-SC)/Internet protocol short message gateway (IP-SM-GW) may manage transmission and reception of an SMS. The SMS-SC serves to relay a short message between a short message entity (SME) (an entity for transmitting or receiving a short message) and a mobile station and store-and-forward the short message. The IP-SM-GW may serve to perform protocol interworking between an IP based UE and an SMS-SC.

A charging data function (CDF)/charging gateway function (CGF) may perform charging related operation.

The HLR/HSS serves to store and provide subscriber information (an international mobile subscriber identity (IMSI), etc.), routing information, configuration information, etc. to the MTC-IWF.

An SGSN/MME may perform a control function such as mobility management, authentication, resource allocation, etc. for connection of a UE to a network. In association with the below-described triggering, the SGSN/MME may serve to receive a trigger indication from the MTC-IWF and process the trigger indication into the form of a message provided to the MTC device.

A gateway GPRS support node (GGSN)/serving gateway (S-GW)+packet data network-gateway (P-GW) may serve as a gateway for connecting a core network to an external network.

Table 2 shows main reference points of FIG. 3.

TABLE 2

| Reference point | Description |
|---|---|
| Tsms | Reference point that an entity outside a 3GPP system uses to communicate with an MTC device via SMS |
| Tsp | Reference point that an SCS uses to communicate with an MTC-IWF related control plane signaling |
| T4 | Reference point used by MTC-IWF to route device trigger to an SMS-SC in HPLMN. |
| T5a | Reference point used between MTC-IWF and SGSN |
| T5b | Reference point used between MTC-IWF and serving MME |
| T5c | Reference point between MTC-IWF and serving MSC |
| S6m | Reference point used by MTC-IWF to interrogate identity information of a UE (E.164 mobile station international subscriber directory number (MSISDN) or external identifier mapping to IMSI) and gather UE reachability and configuration information |
| S6n | Reference point for supporting communication including subscriber information between MTC-AAA and HSS/HLR and MTC device (UE) information. |

Meanwhile, user plane communication with an SCS in case of the indirect and hybrid models and communication with an MTC application server in case of the direct and hybrid models may be performed using a conventional protocol through Gi and SGi. In addition, in 3GPP standards, various methods for implementing MTC, such as a method for adjusting a paging range, for an MTC application having less mobility are proposed. However, communication between MTC devices (e.g. D2D 통신) is not included in current 3GPP standards. For this reason, while MTC operation between an SCS and an MTC device is mainly described by way of example in the present invention, the scope of the present invention is not limited thereto. In other words, a principle proposed in the present invention is apparently applicable to MTC between MTC devices. Further, although communication through a PS network in association with MTC in a 3GPP GSM/UMTS/EPS is defined as described above, this is purely exemplary. That is, the present invention is not restricted to MTC through the PS network and may be applied to MTC through a CS network.

For details associated with description of FIGS. 2 and 3, refer to 3GPP TS 23.682, which is incorporated herein by reference.

NAS Level Congestion Control

In general, the case in which a network exceeds a limit of a controllable amount of communication may be referred to as a network congestion or overload state and operation for controlling a transmission/reception amount for a network to prevent network congestion may be referred to as network congestion control. In a 3GPP MTC network, if network congestion or overload occurs, NAS level congestion control is performed between a UE and a node of a core network (e.g. MME, SGW, PDN-GW, mobile switching center (MSC), SGSN, or GGSN) and thus signaling congestion may be avoided or controlled.

Such NAS level congestion control includes APN based congestion control and general NAS level management control.

APN based congestion control refers to signaling congestion control according to an MM/SM (or an EPS mobility management (EMM)/EPS session management (ESM)) protocol associated with an APN (i.e. an APN associated with a congestion state) and a UE. APN based congestion control includes APN based SM congestion control and APN based MM congestion control.

General NAS level MM control means that a core network node (e.g. MME, SGW, PDN-GW, MSC, SGSN or GGSN) rejects an MM signaling request made by a UE in a general network congestion or overload state, thereby avoiding congestion and overload.

In general, if a core network performs NAS level congestion control, a reject message provided to the UE may include a wait time (or an extended wait time) value. Such a wait time value is randomized within a predetermined range and then provided to the UE. The UE sets the received wait time value as a back-off timer value and operates so as not to request a network to perform (E)MM/(E)SM signaling until the back-off timer expires.

(E)MM signaling includes, for example, an attach request, a TAU/RAU request, etc. In addition, (E)SM signaling includes, for example, PDN connectivity, bearer resource allocation, bearer modification, packet data protocol (PDP) context activation, PDP context modification request, etc. The back-off timer may be divided into an MM back-off timer for (E)MM signaling control and an SM back-off timer for (E)SM signaling control. The MM back-off timer is assigned per UE and the SM back-off timer is assigned per associated APN and per UE. These timers may independently run.

Meanwhile, even when the back-off timer is running, an emergency service must be provided. Accordingly, if a UE has already performed or starts to perform an emergency bearer service with service users having a high priority, it is possible to make a request for the emergency service even when the MM/SM back-off timer is running. The service users having a high priority may be, for example, users accessing a network with multimedia priority service access classes 11 to 15.

TAU/RAU of UE of Idle State

Figure 4:
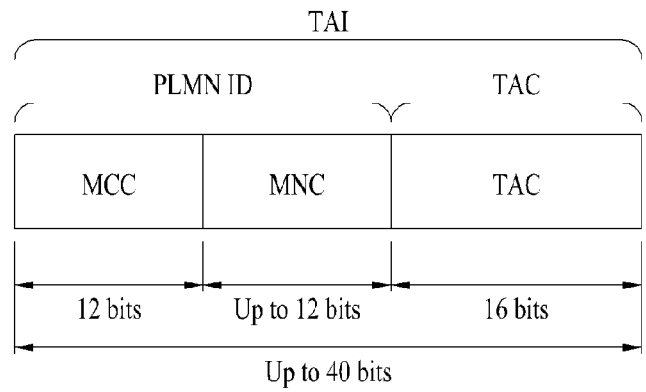
FIG. 4 is a diagram showing the structure of a TAI.

In an LTE network, a TA is a registration unit of a UE and is also a unit used when an MME identifies the location of a UE which is in an idle state. FIG. 4 is a diagram showing the structure of a TAI. The TAI is an identifier (ID) of a TA. The TAI is configured with a combination of a PLMN ID and a tracking area code (TAC) and is an ID capable of uniquely identifying the TA around the world. The PLMN ID includes a mobile country code (MCC) assigned per country and a mobile network code (MNC) assigned per operator. The TAC is an ID for identifying the TA within an operator network.

When the UE accesses an LTE network, an MME performs UE registration. The MME tracks the location of the UE registered thereto to transmit data belonging to the UE to the UE. The MME can recognize a cell to which the UE belongs when the UE is connected to the network. However, when the UE is in an idle state in which the UE is not connected to the network, the MME cannot recognize the location of the UE in the unit of cells. Therefore, when the UE is out of a registration area, the UE should inform the MME of a new registration area. When the UE is in an idle state, the MME may search for the UE from the most recently reported registration area.

The registration area may be defined in the unit of the above-described TA. The TA is a unit including one or more cells or base stations (BSs) and corresponds to a range greater than a cell unit. If a TA in which the UE is located is changed, the UE should report a new TA to the MME and then the MME updates the location of the UE. If data belonging to the UE which is in an idle state is present, the MME informs the UE that there is data to be received by transmitting a paging message to all BSs belonging to the TA most recently reported by the UE. As the size of the TA increases, there is a high probability of rapidly searching for the UE because paging is performed through numerous BSs. However, since signaling overhead increases due to paging, it is necessary to appropriately set the size of the TA. That is, the size of the TA is one of parameters for network optimization.

The MME basically allocates a TAI list to the UE when the UE registers the location thereof to the network. The TAI list is a list for one or more TAs. When the UE moves to a TA in the TAI list from a current TA, the UE does not request TAU. However, when the UE moves a TA which does not belong to the TAI list allocated thereto (i.e. a TAI list recently registered in the MME) or a TAU period has elapsed (i.e. a TAU timer has elapsed), the UE may request that the MME perform TAU. The MME may allocate a different TAI list per UE according to a TAI allocation policy.

RAU operation defined in a GERAN/UMTS is similar to the above-described TAU operation. More specifically, an RA corresponds to a registration area for a PS domain in the GERAN/UMTS. The RA is a registration unit of an MS and is a unit used when an SGSN identifies the location of an MS which is in an idle state. The RA may be identified by an RAI. The RAI consists of an MCC, an MNC, a location area code (LAC), and a routing area code (RAC).

If the RA is changed, the MS should inform the SGSN of a new RA to indicate the location thereof and the SGSN updates the location of the MS. If data belonging to the MS which is in an idle state is present, the SGSN informs the MS that there is data to be received by transmitting a paging message to all BSs belonging to the RA most recently reported by the MS.

The SGSN basically allocates an RAI list to the MS when the MS registers the location thereof to the network. The TAI list is a list for one or more RAs.

When the MS moves to an RA in the RAI list from a current RA, the MS does not request RAU. However, when the MS moves an RA which does not belong to the RAI list allocated thereto (i.e. an RAI list recently registered in the SGSN) or an RAU period has elapsed (i.e. an RAU timer has elapsed), the MS may request that the SGSN perform RAU. The SGSN may allocate a different RAI list per MS according to an RAI allocation policy.

Next, ISR refers to a function in which an idle-mode UE is capable of moving between an E-UTRAN and a GERAN/UTRAN in registered RAs and TAs without performing TAU/RAU with a core network (specifically, an MME or SGSN). If the ISR is activated, the UE may reselect E-UTRAN or GERAN/UTRAN even without updating the network unless the UE gets out of TA(s)/RA(s) registered in the network.

When the UE performs TAU/RAU both in an EPS service (i.e. a PS domain service) network and in a non-EPS service (i.e. a CS domain service) network, this is referred to as combined TAU/RAU.

Improved Congestion Control Method

Generally, a paging procedure is performed when a network or a network control node (e.g. an MME or SGSN) requests a terminal (UE or MS) to perform NAS signaling connection establishment, when a downlink data packet is present, when an MT-call occurs, or when an SMS service is desired to be provided. That is, the network (e.g. MMS/SGSN) may transmit a paging message to the UE/MS through a BS and the UE/MS may transmit a paging response. The paging response may include an attach request, a service request, and an extended service request.

The exemplary cases in which the network or the network control node (e.g. an MME or SGSN) transmits a paging message to a terminal (e.g. UE or MS) may be summarized as follows.

i) The case in which NAS signaling, a CDMA2000 signaling message, or user data to be transmitted to the UE is present. For example, the network may transmit the paging message for an EPS service through an E-UTRAN using an SAE-temporary mobile subscriber identity (S-TMSI) or a paging-TMSI (P-TMSI).

ii) The case in which IMSI attach is need for network error restoration. For example, the network may transmit the paging message for the EPS service through the E-UTRAN using an IMSI.

iii) The case of receiving an MT-call. For example, the network may transmit the paging message for CS fallback for A/Gb or Iu mode. Interface A is used to connect a circuit switched core network (CSCN) to a base station system (BSS). An interface corresponding to interface A in terms of a PS is Gb. The Iu mode is an interface defined to support a GERAN in addition to a UTRAN and is divided into two function portions: an Iu-PS interface supporting a PS service and an Iu-CS interface supporting a CS service.

iv) The case of receiving an SMS. For example, the network may transmit the paging message when a short message (SM) for the UE occurs.

In a normal network situation (i.e. in a network non-congestion state), the paging message in the above cases of i) to iv) may reach the UE via BSs corresponding to a TA/RA of the UE known to the network. In i), the UE transmits a service request message to the network (or MME or SGSN which is the network control node) as a response to the received paging message and performs a corresponding procedure. In ii), the UE performs an attach (i.e. attach with an IMSI) procedure as a response to the received paging message. In iii), the UE transmits an extended service request message to the network (or MME or SGSN which is the network control node) as a response to the received paging message and performs a corresponding procedure. In iv), a paging related procedure is performed according to i) and ii).

Meanwhile, in a network congestion control situation, a paging procedure according to a currently defined operation of a wireless communication system may be problematic as follows.

For instance, in an MTC network congestion situation, the network may set a back-off timer value for the UE through a NAS reject message. The NAS reject message may correspond to, for example, an attach reject message, a TAU reject message, a service reject message, etc. The UE for which the back-off timer value is set operates so as not to request related access or services until the back-off timer expires (i.e. while the back-off timer is running). For example, the MM back-off timer value may be provided by the network (e.g. an MME, SGSN, HSS, etc.) or by a lower layer (e.g. an access stratum (AS)) and is randomly set among basic values between 15 to 30 minutes. In the case in which the MM back-off timer value is provided by the network, the back-off value is set according to a network situation and policy by an operator. In general, the MM back-off timer value may be set to several tens of minutes to several hours. In other words, the UE which has been rejected to performing signaling to the network due to network congestion may perform signaling to the network after several tens of minutes or several hours. Then, congestion or overload that the UE generates with respect to the network is reduced or dispersed so that congestion control can be achieved.

In addition, in the currently defined wireless communication system, when a paging message is transmitted to the UE, the UE may perform a paging response (or by stopping the back-off timer) even though the back-off timer is running. However, the UE cannot perform the paging response in the following cases.

First, problems of execution of the paging response related to an MM back-off timer may be generated in the following cases.

The first scenario is associated with an EPS service.

1) It is assumed that the UE is camping on an E-UTRAN/GERAN/UMTS and is performing a TAU/RAU request.

2) In this case, if network A is congested, the UE receives a TAU reject message/RAU reject message with an MM back-off timer from network A.

3) Next, it is assumed that the UE moves to a new PLMN (i.e. an unregistered PLMN) or a new TA/RA (i.e. an unregistered TA/RA) of network B.

4) In this case, the UE cannot perform TAU/RAU because the MM back-off timer is still running.

5) Even if the back-off timer is running, the UE may be allowed to perform TAU/RAU. However, in this case, if network B is also congested, the UE may receive the TAU reject message/RAU reject message with the MM back-off timer from network B. In other words, when the UE moves to new network B, since TAU/RAU for network B is rejected, the network may continue to fail to recognize a new TA/RA or a new PLMN to which the UE moves.

6) The network may transmit a paging message to search for the UE due to occurrence of a downlink data packet to the UE. The network sends the paging message to the UE in a TA/RA known thereto (i.e. an old PLMN or old TA/RA of network A before the UE moves) and thus the UE cannot receive the paging message.

7) Thus, the UE cannot receive the EPS service.

Next, circuit-switched (CS) fallback may be considered. In an IP-based wireless communication system (e.g. LTE network), a voice call also should be provided based on a voice over IP (VoIP). However, in a situation in which VoIP cannot be fully provided, a voice call function can be able to be provided by switching to a conventional CS based network (e.g. conventional 3G network). CS fallback refers to switching to a conventional CS based communication scheme according to necessity in an IP based network.

The second scenario is associated with CS fallback.

1) It is assumed that the UE is camping on an E-UTRAN/GERAN/UMTS and is performing a TAU request/RAU request.

2) In this case, if network A is congested, the UE receives a TAU reject message/RAU reject message with an MM back-off timer from network A.

3) Next, it is assumed that the UE moves to a new PLMN (i.e. an unregistered PLMN) or a new TA/RA (i.e. an unregistered TA/RA) of network B.

4) In this case, the UE cannot perform TAU/RAU because the MM back-off timer is still running.

5) Even if the back-off timer is running, the UE may be allowed to perform TAU/RAU. However, in this case, if network B is also congested, the UE may receive the TAU reject message/RAU reject message with the MM back-off timer from network B. In other words, when the UE moves to new network B, since TAU/RAU for network B is rejected, the network may continue to fail to recognize a new TA/RA or a new PLMN to which the UE moves.

6) In this case, if an MT-call to the UE occurs and a paging procedure for CS fallback is started, the network sends a paging message to the UE in a TA/RA finally known thereto (i.e. an old PLMN or old TA/RA of network A before the UE moves) and the UE cannot receive the paging message. Then, the UE cannot receive the MT-call.

The third scenario is associated with an SMS.

1) It is assumed that the UE is camping on an E-UTRAN/GERAN/UMTS and is performing a TAU request/RAU request.

2) In this case, network A is congested, the UE receives a TAU reject message/RAU reject message with an MM back-off timer from network A.

3) Next, it is assumed that the UE moves to a new PLMN (i.e. an unregistered PLMN) or a new TA/RA (i.e. an unregistered TA/RA) of network B.

4) In this case, the UE cannot perform TAU/RAU because the MM back-off timer is still running.

5) Even if the back-off timer is running, the UE may be allowed to perform TAU/RAU. However, in this case, if network B is also congested, the UE may receive the TAU reject message/RAU reject message with the MM back-off timer from network B. In other words, when the UE moves to new network B, since TAU/RAU for network B is rejected, the network may continue to fail to recognize a new TA/RA or a new PLMN to which the UE moves.

6) Upon occurrence of an SMS service for the UE, the network sends a paging message to the UE in a TA/RA finally known thereto (i.e. an old PLMN or old TA/RA of network A before the UE moves) and the UE cannot receive the paging message. Then, the UE cannot receive the SMS service.

Thus, even if the UE is allowed to transmit the TAU/RAU request message (i.e. the case in which the UE moves to a new network or a new TA/RA) in a situation in which the MM back-off timer is set for the UE and in a situation before the MM back-off timer expires (i.e. a situation in which the reject message is received due to network congestion and the back-off timer is running), since the UE which has received the TAU/RAU request message in a network congestion state receives the TAU/RAU reject message again together with the MM back-off timer, a new area moved by the UE cannot be registered in the network. Then, the network cannot find the location of the UE and cannot successfully transmit the paging message. Accordingly, in the worst case, the UE (or user) cannot be provided with services for a few hours or more.

To solve the above problems, TAU/RAU should be performed even during back-off timer operation. Especially, when the UE moves to a new area, an area update request of the UE should be processed even though a network of the new area is congested. More specifically, it is assumed in the present invention that the UE is allowed to transmit a TAU or RAU request even though an MM back-off timer is running in the case in which the UE moves to a new TA/RA or a new PLMN which is not registered. In addition, when the UE moves to an unregistered new TA/RA or PLMN, the network should accept the TAU/RAU request of the UE even though the network is congested in order to provide the UE with a downlink data packet, an MT-call, or an SMS service. Then, the location of the UE should be correctly registered in the network and, when the UE is paged, a paging message can be correctly transmitted to the UE and the UE can respond to the paging message.

Hereinafter, various examples of the present invention will be described as to a method for accepting a TAU/RAU request even though a network receiving the TAU/RAU request is congested in the case in which a UE is allowed to perform TAU/RAU while a back-off timer set for the UE is running.

Embodiment 1

In order for a UE to correctly perform a paging response to an MT-call or a paging response to an SMS service, in the case in which the UE moves to an unregistered new TA or RA while an MM back-off timer set for the UE is running, the UE may perform TAU or RAU even if the MM back-off timer is running. For example, upon entering a TA (or RA) which is not included in a TA list (or RA list) registered by the UE in an MME, the UE may transmit a TAU/RAU request message to a network control entity (e.g. an MME or SGSN) even when the MM back-off timer is running.

In this case, even if the network is congested, the network (e.g. MME/SGSN) may accept a TAU/RAU request made by the UE.

To perform such operation, the network (e.g. MME/SGSN) should be capable of distinguishing a TAU/RAU request in the above-described special situation (i.e. the case in which the UE moves to an unregistered TA/RA/PLMN and transmits a TAU/RAU request message while the MM back-off timer is running) and a TAU/RAU request in a normal situation (e.g. the case in which the UE moves to a registered TA/RA/PLMN and transmits a TAU/RAU request message or the case in which a TAU/RAU request message is periodically transmitted). To this end, it is proposed that a TAU/RAU request message transmitted by the UE to the network include new indication information.

The indication information may be explicitly indicated using an information element (IE) in the TAU/RAU request message. For example, a new state or new value of an EPS update type IE or the update type IE may be defined to indicate the special situation (the case in which the UE moves to an unregistered TA/RA/PLMN and transmits the TAU/RAU request message while the MM back-off timer is running). The new state or new value may be expressed as, for example, "TA updating with a new area", "combined TA/RA updating with a new area", "RA updating with a new area", "combined RA/LA(Location Area) updating with a new area", etc. Alternatively, the indication information may be indicated by additionally defining a new IE (e.g. an EPS update status IE or update status IE) included in the TAU/RAU request message.

The network may check the indication information included in the TAU/RAU request message transmitted by the UE to determine whether to accept the TAU/RAU request in a congestion state. For example, if the indication information indicates the special situation (i.e. the case in which the UE moves to an unregistered TA/RA/PLMN and transmits a TAU/RAU request while the MM back-off timer is running), the network may accept the TAU/RAU request even in a congestion state and, otherwise, the network may reject the TAU/RAU request.

In the case in which the network accepts the TAU/RAU request of the UE based on the indication information, the UE may receive a TAU/RAU accept message from the network (e.g. MME/SGSN). Then, after the UE finishes location registration, if a preset MM back-off timer (i.e. an MM back-off timer set by the network before the UE enters a new area) is running, the UE maintains the MM back-off timer until the MM back-off timer expires. In other words, the UE cannot make a mobile originated (MO) service request while the MM back-off timer is running.

Next, upon receiving a paging message, the UE may stop the back-off timer and perform a paging response (e.g. a service request or extended service request).

Embodiment 2

To correctly perform a paging response to an MT-call or a paging response to an SMS service, when the UE moves to an unregistered new TA or RA while an MM back-off timer set for the UE is running, the UE may perform TAU or RAU even if the MM back-off timer is running. For example, upon entering a TA (or RA) which is not included in a TA list (RA list) preregistered by the UE in an MME, the UE may transmit a TAU/RAU request message to a network control entity (e.g. MME or SGSN) even if the MM back-off timer is running.

In this case, the network (e.g. MME/SGSN) may accept a TAU/RAU request made by the UE even when the network is currently congested.

For this operation, the network (e.g. MME/SGSN) should be capable of distinguishing a TAU/RAU request in the above-described special situation (i.e. the case in which the UE moves to an unregistered TA/RA/PLMN and transmits a TAU/RAU request message while the MM back-off timer is running) and a TAU/RAU request in a normal situation (e.g. the case in which the UE moves to a registered TA/RA/PLMN and transmits a TAU/RAU request message or the case in which a TAU/RAU request message is periodically transmitted). To this end, the UE may use indication information included in a TAU/RAU message transmitted by the UE to the network.

The indication information may be implicitly indicated through information included in the TAU/RAU request message. For example, the network may determine whether the TAU/RAU request is caused by movement of the UE to an unregistered new area by using information (e.g. area indication information) predefined in the TAU/RAU request message. For example, the network may compare a TAI value (e.g. a value of a 'last visited registered TAI' IE, etc.) or an RAI value (e.g. a value of a 'routing area identification' IE or a value of an 'old routing area identification' IE) of the TAU/RAU request message with a TAI or RAI value of a current network. If the compared values are different, the network may determine that a UE moving to an unregistered new area (or an unregistered UE) transmits the TAU/RAU request message. In this case, the network operates so as to accept the TAU/RAU request despite congestion.

If the network accepts the TAU/RAU request of the UE based on the indication information, the UE may receive a TAU/RAU accept message from the network (e.g. MME/SGSN). After the UE finishes location registration, if a preset MM back-off timer (i.e. an MM back-off timer set by the network before the UE enters a new area) is running, the UE maintains the MM back-off timer until the MM back-off timer expires. That is, the UE cannot make an MO service request while the MM back-off timer is running.

Next, upon receiving a paging message, the UE may perform a paging response (e.g. a service request or extended service request).

Embodiment 3

To correctly perform a paging response to an MT-call or a paging response to an SMS service, when the UE moves to an unregistered new TA or RA while an MM back-off timer set for the UE is running, the UE may perform TAU or RAU even if the MM back-off timer is running. For example, upon entering a TA (or RA) which is not included in a TA list (RA list) preregistered by the UE in an MME, the UE may transmit a TAU/RAU request message to a network control entity (e.g. MME or SGSN) even if the MM back-off timer is running.

In this case, the network (e.g. MME/SGSN) may accept a TAU/RAU request made by the UE even when the network is currently congested.

For this operation, the network (e.g. MME/SGSN) should be capable of distinguishing a TAU/RAU request in the above-described special situation (i.e. the case in which the UE moves to an unregistered TA/RA/PLMN and transmits a TAU/RAU request message while the MM back-off timer is running) and a TAU/RAU request in a normal situation (e.g. the case in which the UE moves to a registered TA/RA/PLMN and transmits a TAU/RAU request message or the case in which a TAU/RAU request message is periodically transmitted). To this end, the UE may use indication information included in a TAU/RAU message transmitted by the UE to the network.

The indication information may be configured by a combination of Embodiments 1 and 2. For example, when the UE moves to an unregistered new area, the UE may transmit the TAU/RAU request message including the explicit information indicating that the UE makes a TAU/RAU request (e.g. a specific state or a specific value such as an EPS update type IE, an update type IE, an EPS update status IE, an update status IE, etc.) and the predefined area indication information (e.g. a TAI value or RAI value) to the network. The network may check a value of the indication information in the received TAU/RAU request message (e.g. check whether an IE such as the EPS update type, etc. is set to a specific value) and/or compare the value of the indication information with a value of information stored therein (e.g. compare a TAI/RAI value in the TAU/RAU request message and a TAI/RAI value stored in the network) to determine whether the TAU/RAU request message is transmitted by the UE moving to an unregistered new area (even when the MM back-off timer is running). For example, if the determination results according to the explicit indication information and to an implicit indication by the TAI/RAI values indicate that the TAU/RAU request is made by the UE moving to an unregistered new area, the network may accept the TAU/RAU request even in a congestion state. Alternatively, if at least one of the determination results according to the explicit indication information and to the implicit indication by the TAI/RAI values indicates that the TAU/RAU request is made by the UE moving to an unregistered new area, the network may accept the TAU/RAU request even in a congestion state. If not, the network may not accept the TAU/RAU request message in a congestion state or may accept the TAU/RAU request message in a non-congestion state.

If the network accepts the TAU/RAU request of the UE based on the indication information, the UE may receive the TAU/RAU accept message from the network (e.g. MME/SGSN). After the UE finishes location registration, if a preset MM back-off timer (i.e. an MM back-off timer set by the network before the UE enters a new area) is running, the UE maintains the MM back-off timer until the MM back-off timer expires. That is, the UE cannot make an MO service request while the MM back-off timer is running.

Next, upon receiving a paging message, the UE may immediately perform a paging response (e.g. a service request or extended service request).

The indication information included in the TAU/RAU request message proposed in Embodiments 1 to 3 may indicate only whether the TAU/RAU request of the UE is made because the UE moves to an unregistered new area and does not indicate whether the UE performs TAU/RAU while the MM back-off timer preset by the network is running. In the conventional scheme, the UE cannot transmit the TAU/RAU request message to the network while the MM back-off timer is running as described above. However, according to UE operation assumed in the present invention, the UE may exceptionally transmit the TAU/RAU request message when the UE moves to an unregistered new area (TA/RA/PLMN) even though the MM back-off timer is running. Accordingly, transmission of the TAU/RAU request message by the UE when the UE moves to an unregistered new area (TA/RA/PLMN) means that the TAU/RAU request message is transmitted while the MM back-off timer is not running or while the MM back-off timer is running. Especially, in order to solve problems when the UE is not capable of performing a paging response when TAU/RAU requested by the UE moving to an unregistered new area is rejected while the MM back-off timer is running as proposed in the present invention, such TAU/RAU should be accepted even when the network is congested. Therefore, the network needs to determine whether TAU/RAU of the UE is performed due to movement of the UE to an unregistered area (or in terms of the network, whether a TAU/RAU request is made by an unregistered UE) even though the network does not confirm whether the MM back-off timer is running in the UE. If TAU/RAU is performed due to movement of the UE to an unregistered area, the network may operate so as to accept the TAU/RAU request even in a congestion state. Further, when the RAU/RAU request message is transmitted by the UE while the MM back-off timer is running (this means that the TAU/RAU message is transmitted due to movement of the UE to an unregistered area (or the TAU/RAU request message is transmitted by an unregistered UE)), the network operates to accept the RAU/RAU request despite congestion, thereby solving the above-described problems of the conventional scheme.

Figure 5:
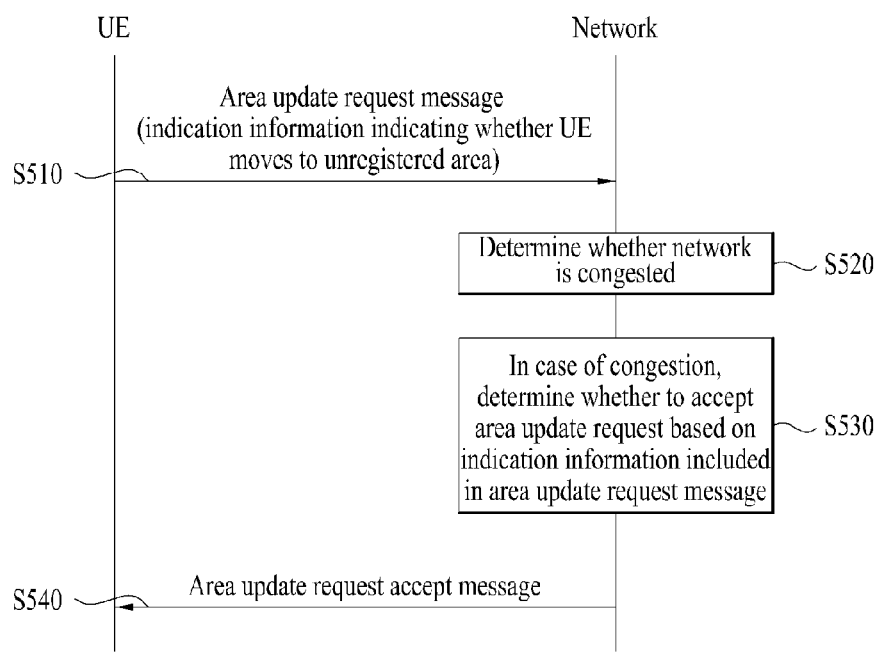
FIG. 5 is a flowchart for explaining an area update method according to an example of the present invention.

FIG. 5 is a flowchart for explaining an area update method according to an example of the present invention.

In step S510, a UE may transmit an area update request message (e.g. a TAU/RAU request message, a combined TAU/RAU request message, or a location update request message) including indication information to a network. The indication information may indicate whether the area update request message is transmitted due to movement of the UE to an unregistered area. For example, the indication information may be configured according to the above Embodiments 1 to 3.

Although not shown in FIG. 5, an MM back-off timer in the UE may be running when Step S510 is performed. If the MM back-off timer is running, the area update request message cannot be transmitted in principle. However, the area update request message is exceptionally allowed to be transmitted when the UE moves to an unregistered new area. The present invention proposes a method in which the network processes the area update request message in the above exceptional situation under assumption of such UE operation.

In Step S520, the network judges whether the state thereof is congested. If the network is not congested, the area update request message may be accepted (i.e. the network proceeds to Step S540). If the network is congested, the network proceeds to Step S530.

In Step S530, the network may determine whether to accept an area update request based on the indication information included in the area update request message. For example, if the indication information indicates that the area update request is made when the UE moves to an unregistered new area (or moves to an unregistered new area while the MM back-off timer is running) (i.e. in terms of the network, if the area update request is made by an unregistered UE), the network may accept the area update request (the network proceeds to Step S540). If the area update request is not made by the UE moving to an unregistered new area, the network may not accept the area update request.

Figure 6:
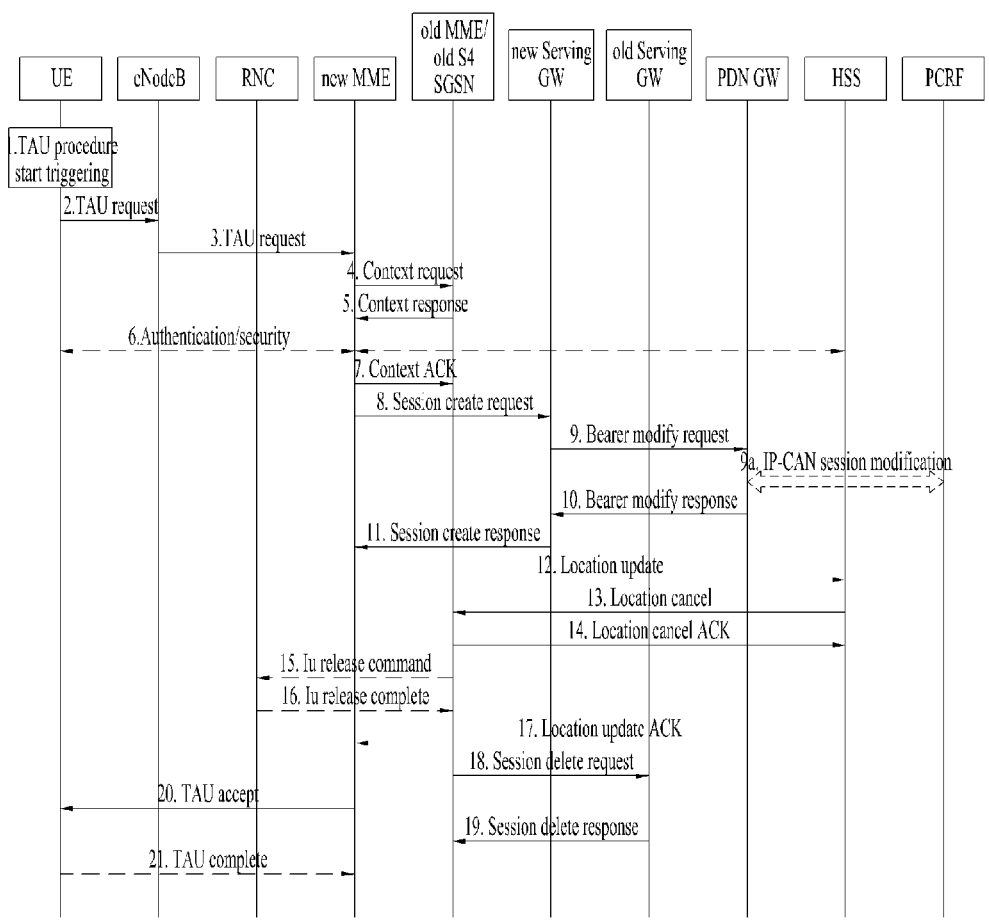
FIG. 6 is a flowchart showing TAU operation according to an example of the present invention.

FIG. 6 is a flowchart showing TAU operation according to an example of the present invention.

In Step 1 of FIG. 6, a UE may trigger start of a TAU procedure. Operation of triggering start of the TAU procedure may be performed when the UE moves to an unregistered new area even though a back-off timer is running as described above. The back-off timer may be an MM back-off timer included in a NAS reject message received from a network prior to UE movement.

If the start of the TAU procedure of the UE is triggered, the UE may include indication information (refer to the above Embodiments 1 to 3) in a TAU request message, wherein the indication information indicates that the TAU request message is generated in the case in which the UE moves to an unregistered new area (e.g. TA).

In Steps 2 and 3 of FIG. 6, the UE may transmit the TAU request message (or combined TAU request message) to a new MME via an eNB. In FIG. 6, a new MME and a new SGW may be an MME and an SGW related to a new location area of the UE, respectively, and an old MME and an old SGW may be an MME and an SGW related to an old location area of the UE, respectively.

Upon receiving the TAU request message, the network may judge whether a network state is congested. If the network is not congested, the network may accept the TAU request message. If the network is congested, the network may determine whether to accept the TAU request by checking the indication information included in the TAU request message. For example, upon receiving the TAU request message including the indication information indicating that the UE moves to an unregistered new area, the new MME may operate to accept the TAU request of the UE even when the network is congested.

More specifically, as in Embodiment 1, if the indication information explicitly indicates that a TAU request is made when the UE moves to an unregistered new area, the network may accept the TAU request and, if not, the network may not accept the TAU request. Alternatively, as in Embodiment 2, the network may compare a TAI value included in the TAU request message with a TAI value prestored in the network. If the two values are different, the network may determine that the indication information implicitly indicates that the TAU request is made when the UE moves to an unregistered new area and accepts the TAU request. If the TAI value in the TAU request message is the same as the TAI value of the network, the network may not accept the TAU request. Alternatively, as in Embodiment 3, the network may determine whether to accept the TAU request by a combination of Embodiments 1 and 2.

In Steps 4 and 5 of FIG. 6, the new MME may exchange a context request message and a context response message with the old MME/SGSN.

In Step 6 of FIG. 6, an authentication and/or security related information may be exchanged between the UE and the new MME and between the new MME and an HSS.

In Step 7 of FIG. 6, the new MME may transmit, to the old MME/SGSN, a context acknowledgement (ACK) message indicating that context information has been successfully received.

The operation of the network (e.g. new MME) for determining whether the network is congested and determining whether to accept the TAU request based on the indication information included in the TAU request message may be performed after Step 7.

In Steps 8 to 11 of FIG. 6, the new MME may transmit a session create request message to the new SGW to generate a session. The new SGW may transmit a bearer modify request message to a PGW based on information included in the session create request message. The PGW may transmit a bearer modify response message to the new SGW in response to the bearer modify request message and the new SGW may transmit a session create response message to the new MME.

Step 9a of FIG. 6 is an optional step. When necessary, RCRF mutual operation for an operator policy may be initiated by a policy and charging enforcement function (PCEF) of a PGW and may be performed between a PCEF and a PCRF. For example, an IP-connectivity access network (CAN) session, which is a session of an access network for providing IP connectivity, may be modified. The IP-CAN refers to a variety of IP-based access networks. For example, the IP-CAN may be a GPRS or EDGE, which is a 3GPP access network, or may be a WLAN or digital subscriber line (DSL) network.

In Steps 12 to 14 of FIG. 6, the new MME may provide updated location information of the UE to the HSS and the HSS may store the updated location information. The HSS may transmit a cancel message for location information of the UE to the old MME/SGSN and then the old MME/SGSN may cancel the location of the UE and transmit an ACK message for location cancellation to the HSS.

In Steps 15 and 16 of FIG. 6, the old MME/SGSN may transmit an Iu release command message to an RNC and the RNC may transmit an Iu release complete message to the old MME/SGSN.

In Step 17 of FIG. 6, the HSS may transmit an ACK message for UE location update to the new MME.

In Step 18 of FIG. 6, the old MME/SGSN may transmit a session delete request message to the old SGW and the old SGW may transmit a session delete response message to the old MME/SGSN.

In Steps 20 to 21 of FIG. 6, the new MME may transmit a TAU accept message to the UE and the UE may complete the TAU procedure by transmitting a TAU complete message to the new MME in response to the TAU accept message.

Upon receiving the TAU accept message from the network, the UE maintains an MM back-off timer until the MM back-off timer expires if the MM back-off timer which is preset (by the network before the UE moves to a new area). In other words, UE cannot perform an MO service request while the MM back-off timer is running. However, if a paging message is received while the MM back-off timer is running, the UE may stop the back-off timer and perform a paging response (e.g. a service request or extended service request).

Figure 7:
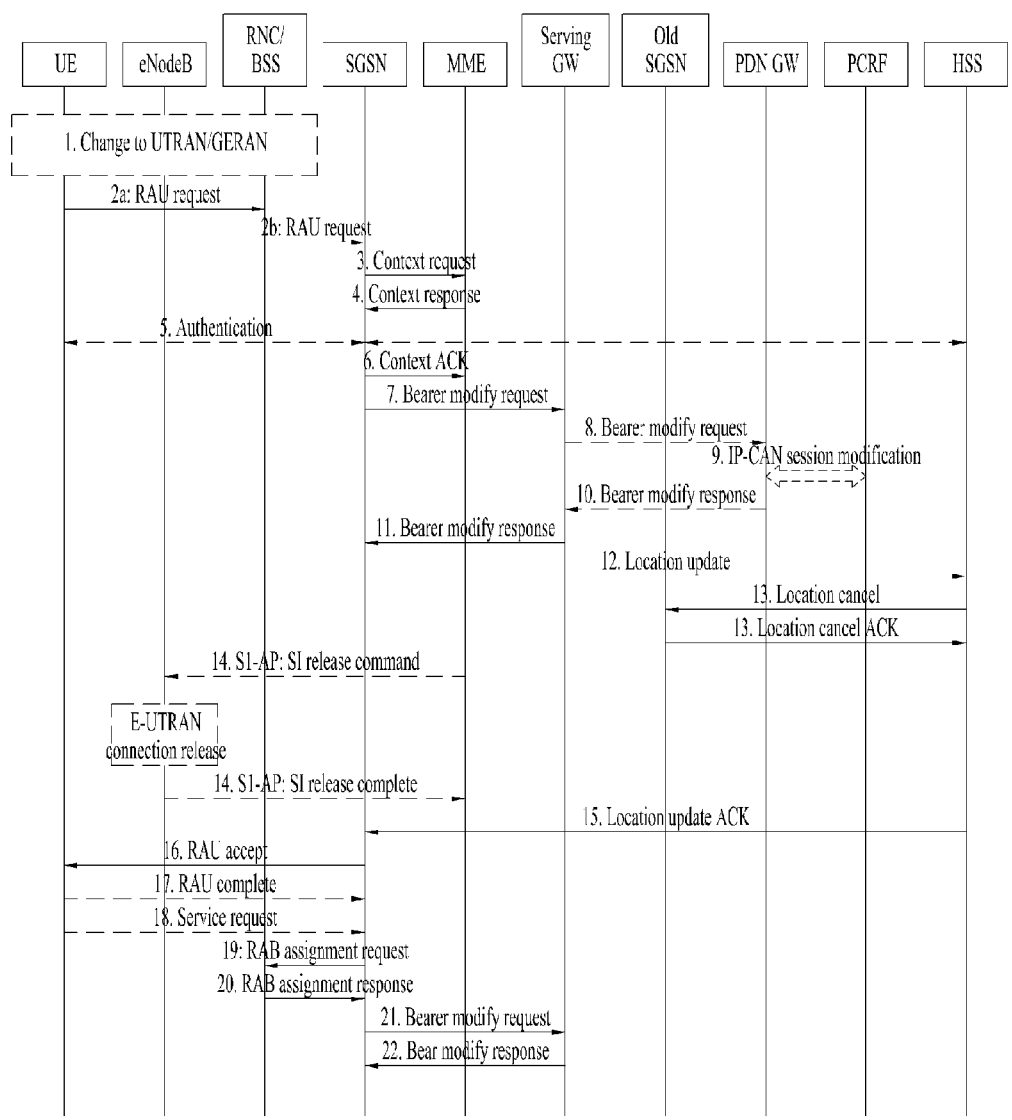
FIG. 7 is a flowchart showing RAU operation according to an example of the present invention.

FIG. 7 is a flowchart showing RAU operation according to an example of the present invention.

In Step 1 of FIG. 7, it is assumed that a UE is changed from operation mode of an E-UTRAN to operation mode of a UTRAN/GERAN or moves to a UTRAN/GERAN system area. In addition, in Step 1, a UE may trigger start of an RAU procedure. Operation of triggering start of the RAU procedure may be performed when the UE moves to an unregistered new area even though a back-off timer is running as described above. The back-off timer may be an MM back-off timer included in a NAS reject message received from a network prior to UE movement.

If the start of the RAU procedure of the UE is triggered, the UE may include indication information (refer to the above Embodiments 1 to 3) in an RAU request message, wherein the indication information indicates that the RAU request message is generated in the case in which the UE moves to an unregistered new area (e.g. RA).

In Steps 2a and 2b of FIG. 7, the UE may transmit the RAU request message to an SGSN via an RNC/BSS.

Upon receiving the RAU request message, the network may judges whether a network state is congested. If the network is not congested, the network may accept the RAU request message. If the network is congested, the network may determine whether to accept the RAU request by checking the indication information included in the RAU request message. For example, upon receiving the RAU request message including the indication information indicating that the UE moves to an unregistered new area, the SGSN may operate to accept the RAU request of the UE even when the network is congestion.

More specifically, as in Embodiment 1, if the indication information explicitly indicates that a RAU request is made when the UE moves to an unregistered new area, the network may accept the RAU request and, if not, the network may not accept the RAU request. Alternatively, as in Embodiment 2, the network may compare an RAI value included in the RAU request message with an RAI value prestored in the network. If the two values are different, the network may determine that the indication information implicitly indicates that the RAU request is made when the UE moves to an unregistered new area and accepts the RAU request. If the RAI value in the RAU request message is the same as the RAI value of the network, the network may not accept the RAU request. Alternatively, as in Embodiment 3, the network may determine whether to accept the RAU request by a combination of Embodiments 1 and 2.

Operation of steps 3 to 7 of FIG. 7 corresponds to operation of steps 4 to 7 described with reference to FIG. 6. The old MME of FIG. 6 corresponds to an MME of FIG. 7 and the new MME of FIG. 6 corresponds to an SGSN of FIG. 7. Therefore, a new control node (SGSN) may obtain context information from an old control node (MME) and perform an authentication/security procedure with an HSS and the UE.

The operation of the network (e.g. SGSN) for determining whether the network is congested and determining whether to accept the RAU request based on the indication information included in the RAU request message may be performed after Step 7.

In Steps 7 to 11 of FIG. 7, the SGSN may transmit a bearer modify request message to a PGW via an SGW in order to configure a bearer. The PGW may transmit a bearer modify response message to the SGSN via the SGW in response to the bearer modify request message. Step 9 is optional. When necessary, a procedure for modification of an IP-CAN session initiated by a PCEF may be performed.

In Steps 12 to 14 of FIG. 7, the SGSN may provide updated location information of the UE to the HSS and the HSS may store the updated location information. The HSS may transmit a cancel message for location information of the UE to an old SGSN and then the old SGSN may cancel the location of the UE and transmit an ACK message for location cancellation to the HSS.

In Step 14 of FIG. 7, an S1 interface release procedure associated with an old location of the UE may be performed between the MME and an eNodeB. The MME may transmit an S1 release command message to the eNodeB using an S1 application protocol. Then, the eNode may release E-UTRAN connection and transmit an S1 release complete message to the MME.

In Step 15 of FIG. 7, the HSS may transmit an ACK message for UE location update to the SGSN.

In Steps 16 and 17 of FIG. 7, the SGSN may transmit an RAU accept message to the UE and the UE may complete the RAU procedure by transmitting an RAU complete message to the new MME in response to the RAU accept message.

Upon receiving the RAU accept message from the network, the UE maintains an MM back-off timer until the MM back-off timer expires if the MM back-off timer which is preset (by the network before the UE moves to a new area). In other words, UE cannot perform an MO service request while the MM back-off timer is running. However, if a paging message is received while the MM back-off timer is running, the UE may stop the back-off timer and perform a paging response (e.g. a service request or extended service request).

For example, in step 18 of FIG. 7, the UE may transmit a service request message to the SGSN when necessary. In steps 19 and 20 of FIG. 7, the SGSN may transmit a radio access bearer (RAB) assignment request to the RNC/BSS and the RNC/BSS may transmit an RAB assignment response message to the SGSN. In steps 21 and 22 of FIG. 7, the SGSN may transmit a bearer modify request message to the SGW and the SGW may transmit a bearer modify response message to the SGSN. Accordingly, a radio bearer can be provided to the UE and services can be provided to the UE.

Description of the above-described various embodiments of the present invention may be independently applied or two more embodiments thereof may be simultaneously applied.

While the above-described examples of the present invention has been exemplarily described as being applied to a radio communication service of an MTC scheme, the principle proposed in the present invention may be equally applied even to location update operation of a general radio communication system.

Figure 8:
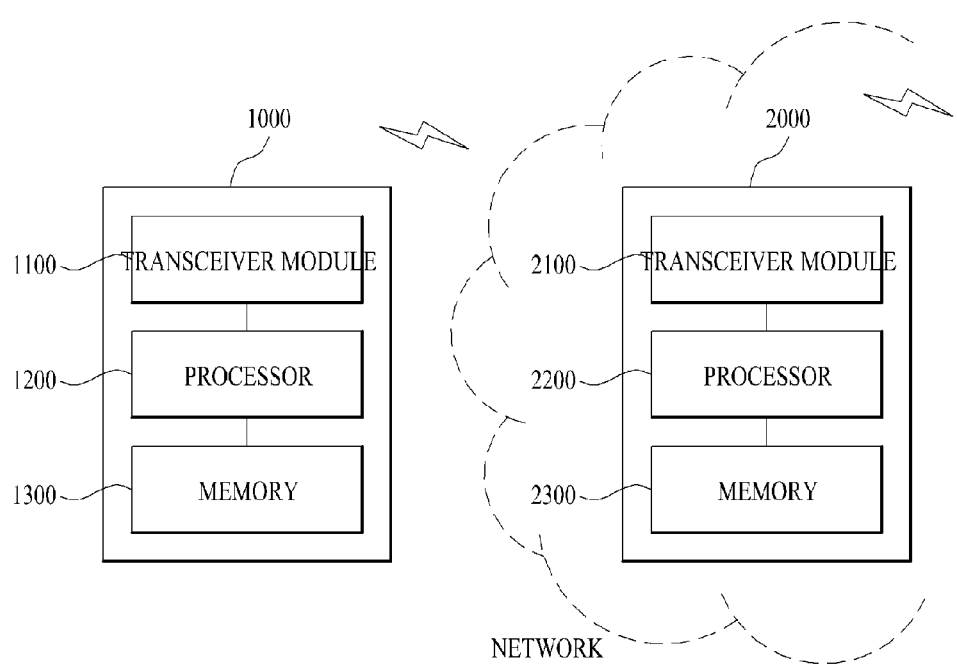
FIG. 8 is a diagram showing the configuration of a terminal device according to an embodiment of the present invention.

FIG. 8 is a diagram showing the configuration of a UE according to an embodiment of the present invention.

Referring to FIG. 8, a UE 1000 according to the present invention may include a transceiver module 1100, a processor 1200, and a memory 1300. The transceiver module 1100 may be configured to transmit various signals, data, and information to an external device and receive various signals, data and information from the external device. The terminal device 1000 may be connected to the external device by wire or wirelessly. The processor 1200 may control overall operation of the UE 1000 and may be configured to perform a function for processing information transmitted from the UE 1000 to the external device or from the external device to the UE 1000. In addition, the processor 1200 may be configured to perform the UE operation proposed in the present invention. The memory 1300 may store the processed information for a predetermined time and may be replaced by a buffer (not shown).

Referring to FIG. 8, a network node device 2000 of the present invention may include a transceiver module 2100, a processor 2200, and a memory 2300. The transceiver module 2100 may be configured to transmit various signals, data, and information to an external device and receive various signals, data and information from the external device. The network node device 2000 may be connected to the external device by wire or wirelessly. The processor 2200 may control overall operation of the network node device 2000 and may be configured to perform a function for processing information transmitted from the network node device 2000 to the external device or from the external device to the network node device 2000. In addition, the processor 2200 may be configured to perform the network node operation proposed in the present invention. The memory 2300 may store the processed information for a predetermined time and may be replaced by a buffer (not shown).

The overall configurations of the UE 1000 and the network device 2000 may be implemented such that above described various methods and/or embodiments of the present invention may be independently applied or two or more methods and/or embodiments thereof may be simultaneously applied and a repeated description is omitted for clarity.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it may transmit and receive data to and from the processor via a variety of well-known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. The invention should not be limited to the specific embodiments described herein, but should be accorded the broadest scope consistent with the principles and novel features disclosed herein. In addition, claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention as described above are applicable to various mobile communication systems.

The invention claimed is:

1. A method for processing an area update request of a user equipment (UE) in a network node, the method comprising:
   receiving an area update request message from the UE;
   determining whether to accept an area update request based on the area update request message when the network node is congested;
   accepting the area update request message when the area update request message includes indication information indicating that the UE moves to a new area that is not registered by the UE while a backoff timer is running at the UE; and
   rejecting the area update request message when the area update request message does not include the indication information.

2. The method according to claim 1, further comprising transmitting an area update request accept message to the UE when the area update request message is accepted.

3. The method according to claim 2, wherein, if the UE receives the area update request accept message while the back-off timer is running in the UE, the back-off timer is maintained until the back-off timer expires.

4. The method according to claim 1, wherein, when the area update request is accepted, if the UE receives a paging message while a back-off timer is running, the UE stops the back-off timer and performs a response to the paging message.

5. The method according to claim 1, wherein the new area is a new tracking area (TA), a new routing area (RA), or a new public land mobile network (PLMN).

6. The method according to claim 5, wherein the new TA or the new RA is a TA or an RA not included in a TA list or an RA list registered by the UE.

7. The method according to claim 1, wherein the area update request message is one of a tracking area update (TAU) message, a routing area update (RAU) message, a combined TAU message, and a combined RAU message.

8. The method according to claim 1, wherein the area update request message is transmitted even when a back-off timer is running in the UE.

9. The method according to claim 8, wherein the area update request message is transmitted when the UE enters the new area even when the back-off timer is running.

10. The method according to claim 8, wherein a value for the back-off timer is included in a non-access stratum (NAS) reject message from a network before the UE enters the new area.

11. The method according to claim 8, wherein the back-off timer is a mobility management (MM) back-off timer.

12. A network node for processing an area update request of a user equipment (UE), the network node comprising:
   a transceiver; and
   a processor that:
      controls the transceiver to receive an area update request message from the UE,
      determines whether to accept the area update request based on the area update request message when the network node is congested,
      accepts the area update request message when the area update request message includes indication information indicating that the UE moves to a new area that is not registered by the UE while a backoff timer is running at the UE, and
      rejects the area update request message when the area update request message does not include the indication information.

* * * * *